J. Long,
Gas Meter.
Nº 7,154.      Patented Mar. 5, 1850.

UNITED STATES PATENT OFFICE.

JAMES LONG, OF CHICAGO, ILLINOIS.

IMPROVEMENT IN GAS-METERS.

Specification forming part of Letters Patent No. 7,154, dated March 5, 1850.

*To all whom it may concern:*

Be it known that I, JAMES LONG, of Chicago, in the county of Cook and State of Illinois, have invented a new and useful Machine for Measuring Gas; and I do hereby declare that the following is a full, clear, and exact description of the construction and operation of the same, reference being had to the annexed drawings, which are made part of this specification, in which—

Figure 2:
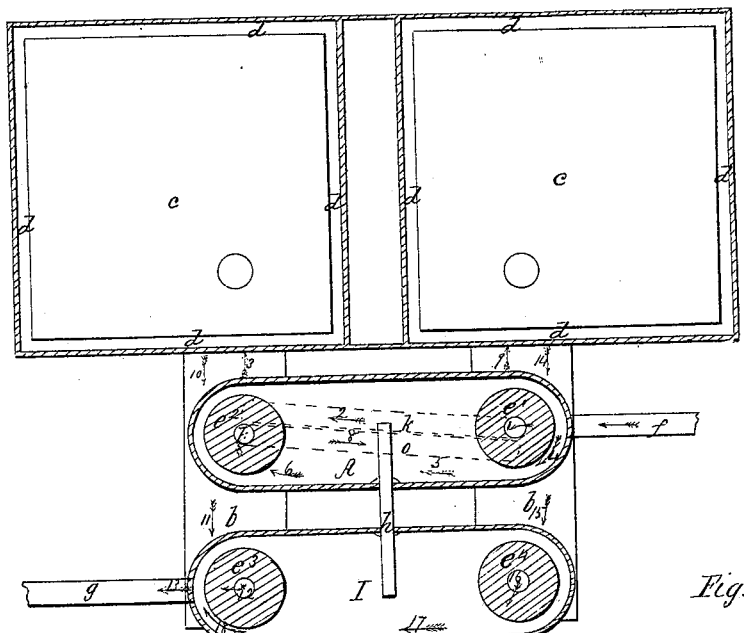
Figures 1, 3:
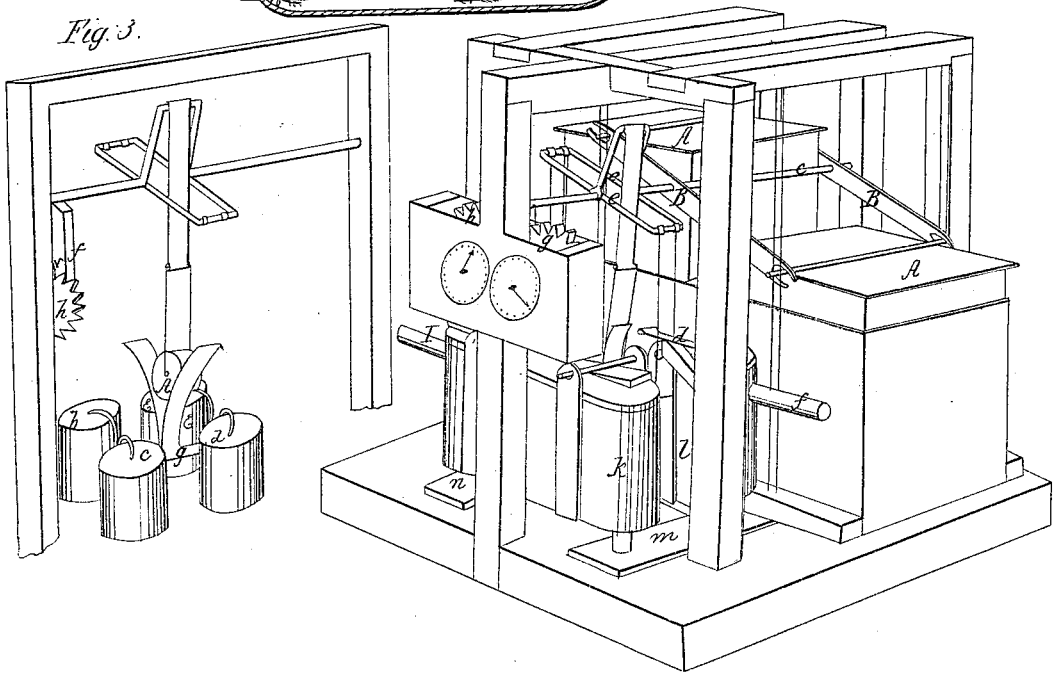

Figure 1 is a perspective view, Fig. 2 a bird's-eye view, and Fig. 3 a representation, of the valves and working of the index:

The two inverted cups or gasometers, Fig. 1, A A, are connected together at the top by two beams, Fig. 1, B B, fastened at their centers to a shaft, $c$, and working loose at the ends (or attached, as may be) on a wire crossing the center of each of the cups. These cups set and work in a groove or cistern, as shown in Fig. 2, $d\ d\ d$, &c., wide enough to admit of free motion, and filled, or nearly so, with liquid, and the cups or meters, being filled and emptied as the gas flows through the machine, measure it out. The gas, going in at the tube $f$, Fig. 2, into the chamber A, Fig. 2, in which are two valves, $e'$ and $e^2$, Fig. 2, and flowing through the one open, $e'$, and through the pipe K, Fig. 2, following the darts 1, 2, and 3, raises the inverted cup on the opposite side to the valve until full, when, the valves being changed and $e^2$ and $e^3$ open and $e'$ and $e^4$ shut, it flows through the opposite valve, $e^2$, and through the pipe $o$, Fig. 2, following the darts 4 5 6 7 8 9 into the other inverted cup, raising it and depressing the first raised, pressing by the same head the gas out of the first through the channel $b$, Fig. 2, following the darts 10, 11, 12, and 13 by the pipe $g$, Fig. 2, into the burner, the next change of the valves emptying the second raised cup, by the channel indicated by the darts 14, 15, 16, 17, and 18, through said pipe $g$ into the burner. The elevation and depression of these cups give motion to the shaft $c$, Fig. 1, and, as shown, raises the latches $d$, Fig. 1, and the one opposite alternately by means of the wires attached to the arms $e\ e$, Fig. 1, thus letting the weight A, Fig. 3, move the valves $b$, $c$, $d$, and $e$, Fig. 3, by one motion, all at the same time, as the crank inclines it. The valves are four in number, in air-tight chambers, and all fastened together, Fig. 3, and are inverted cups over tubes surrounded by quicksilver, into which they dip when closing. The lightest pressure of gas will cause the machine to work, the weight moving the valves being no more than enough to equalize the movement of the measuring-cups, the one submerging requiring a little weight as it nears the bottom, and which is rendered by the turning of the crank precisely as needed. The index is moved by a treadle, $f$, Fig. 3, on the shaft, the wheel being turned one cog for the emptying of both cups, and this wheel having but one leaf on the pinion, consequently for every revolution of itself turns the wheel $h$, Fig. 1, one cog.

The machine will measure with great accuracy, and is not affected in the least by the evaporation or change of level of the liquid in which it moves, as the amount measured out is precisely according to the distance the cups rise and fall, and this, being regulated by the machinery, may be made very perfect.

What I claim as my invention, and desire to secure by Letters Patent, is—

1. The use of the four mercurial valve-cups, as described, for filling and discharging alternately the two measuring-gasometers, as set forth.

2. The shaft $c$, in combination with the levers B $e$ and pawl $f$, for giving simultaneous movement to the hands of the dials, the valves, and the gasometers, as set forth.

JAS. LONG.

Witnesses:
L. D. HOARD,
E. A. RUCKERS.